United States Patent
Gregorio

(10) Patent No.: US 7,096,852 B2
(45) Date of Patent: Aug. 29, 2006

(54) HAPTIC THROTTLE DEVICES AND METHODS

(75) Inventor: Pedro Gregorio, Verdun (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 10/975,051

(22) Filed: Oct. 28, 2004

(65) Prior Publication Data

US 2005/0092294 A1 May 5, 2005

Related U.S. Application Data

(60) Provisional application No. 60/516,187, filed on Oct. 30, 2003.

(51) Int. Cl.
*F02D 11/10* (2006.01)

(52) U.S. Cl. .................................................... 123/399

(58) Field of Classification Search ............... 123/361, 123/396, 399
See application file for complete search history.

(56) References Cited

U.S. PATENT DOCUMENTS

| | | | | |
|---|---|---|---|---|
| 4,380,799 A | * | 4/1983 | Allard et al. ............... | 123/396 |
| 4,574,757 A | * | 3/1986 | Schulman et al. .......... | 123/396 |
| 6,362,729 B1 | * | 3/2002 | Hellmann et al. .......... | 340/436 |
| 6,525,711 B1 | | 2/2003 | Shaw et al. ................. | 345/156 |
| 6,904,823 B1 | * | 6/2005 | Levin et al. ............ | 74/471 XY |
| 6,961,644 B1 | * | 11/2005 | Mercier et al. ............... | 701/36 |
| 2003/0130091 A1 | * | 7/2003 | Wafzig ...................... | 477/120 |

OTHER PUBLICATIONS

Buchholz, Kami, "Enhanced Lighting One of BMW Research Focuses", Focus on Electronics, AEI Automotive Engineering International, pp. 97-103, Feb. 2003.
Varhelyi, Andras et al., "The Effects of Large Scale Use of Active Accelerator Pedal In Urban Areas", 15th ICTCT Workshop, Brno, Czech Republic, pp. 1-7, Oct. 24-25, 2002.
"Electronic Throttle Control—(Drive By Wire or Fly By Wire)", Auto-Solve, Miscellaneous Topics, date unknown.

* cited by examiner

*Primary Examiner*—T. M. Argenbright
(74) *Attorney, Agent, or Firm*—Thelen Reid & Priest LLP; David B. Ritchie, Esq.

(57) ABSTRACT

An apparatus includes a sensor configured to be coupled to a throttle interface. The sensor is configured to output a sensor signal associated with a condition of the throttle interface. A first brake element has a first friction surface and a second brake element has a second friction surface. The second brake element is configured to be coupled to the throttle interface. The friction surface associated with the first brake element is positioned opposite the friction surface associated with the second brake element. The first brake element is configured to move relative to the second brake element. An actuator is coupled to the first brake element and is configured to output haptic feedback to the throttle interface via the first brake element based on the sensor signal.

19 Claims, 5 Drawing Sheets

HAPTIC THROTTLE DEVICES AND METHODS

CROSS-REFERENCE TO RELATED APPLICATION

This application claims the benefit of U.S. Patent Application No. 60/516,187, entitled "Self-Regulating Resistive Actuator for Automotive Throttle Pedal Force Feedback," filed on Oct. 30, 2003, the entirety of which is incorporated herein by reference.

BACKGROUND

The invention relates generally to haptic feedback systems, and more particularly, to a haptic feedback system associated with an automotive throttle actuator.

Control of a vehicle through the use of electronically-controlled mechanisms rather than mechanically-controlled mechanisms has been implemented in different forms. Typically called "steer-by-wire," "drive-by-wire," or "control-by-wire," electronically-controlled mechanisms direct electric motors and/or hydraulic or pneumatic control systems, to perform mechanical operations rather than a user directly performing the mechanical operations using a mechanical interface. For example, in a standard mechanical steering system in an automobile, the user moves a steering wheel, which mechanically rotates rods, gears, and other mechanical elements to turn the front wheels based on the motion of the steering wheel. In a drive-by-wire system, the user rotates the steering wheel (or moves some other type of manipulandum) to generate control signals to control one or more electric motors, hydraulic actuators, etc., which turn the front wheels. No mechanical linkage between steering wheel motion and wheel motion exists (unlike power assisted steering). A processor (microprocessor, etc.) can be used to sense motion of the steering wheel and correlate it with motor control to achieve the corresponding steering of the wheels.

Another vehicle control system that is typically now electronically-controlled rather than mechanically-controlled is the vehicle throttle control. Automotive throttle pedals historically provided a characteristic force against a driver's foot as a function of pedal displacement. In the past, this force was associated with mechanical linkages and a cable connecting the throttle pedal to the throttle valve in the engine. Rather than direct pedal control of throttle position, newer Electronic Throttle Control (ETC) systems use servo-valves.

In ETC systems, the throttle pedal provides only a sensor input to the ETC and, in the absence of the inherent friction associated with traditional mechanical throttle valve linkages, the characteristic force feedback to the driver must be recreated by other means. The force profile associated with known throttle control generally includes an increasing reaction force against the driver's foot the farther the pedal is depressed. This increased physical effort applied by the driver is consistent with the increased effort associated with the vehicle to achieve the desired acceleration.

Known mechanical systems that reproduce and/or simulate the necessary friction, however, are not ideal due to variation in the friction output associated with various parameters including system component inconsistencies, mechanical wear of system components, and variation in operating environment (e.g., temperature, humidity, atmospheric pressure, etc.).

A need exists for improvements in feedback to throttle controls using throttle-by-wire systems to produce desired haptic effects.

SUMMARY OF THE INVENTION

An apparatus is disclosed that includes a sensor configured to be coupled to a throttle interface. The sensor is configured to output a sensor signal associated with a condition of the throttle interface. A first brake element has a first friction surface and a second brake element has a second friction surface. The second brake element is configured to be coupled to the throttle interface. The friction surface associated with the first brake element is positioned opposite the friction surface associated with the second brake element. The first brake element is configured to move relative to the second brake element. An actuator is coupled to the first brake element and is configured to output haptic feedback to the throttle interface via the first brake element based on the sensor signal.

In other embodiments, a method includes receiving a first input signal from a throttle interface, outputting a sensor signal associated with the input signal, the sensor signal being associated with the first input signal, outputting via an actuator haptic feedback associated with the sensor signal, receiving a second input signal at a processor, the second input signal being associated with information independent of an operation of the throttle interface, and outputting haptic feedback associated with the second input signal.

DETAILED DESCRIPTION

An apparatus is disclosed that includes a sensor configured to be coupled to a throttle interface. The sensor is configured to output a sensor signal associated with a condition of the throttle interface. A first brake element has a first friction surface, and a second brake element has a second friction surface. The second brake element is configured to be coupled to the throttle interface. The friction surface associated with the first brake element is positioned opposite the friction surface associated with the second brake element. The first brake element is configured to move relative to the second brake element. An actuator is coupled to the first brake element and is configured to output haptic feedback to the throttle interface via the first brake element based on the sensor signal.

In other embodiments, a method includes receiving a first input signal from a throttle interface and outputting a sensor signal associated with the input signal, the sensor signal being associated with the first input signal. Haptic feedback associated with the sensor signal is output via an actuator. A second input signal is received at a processor, the second input signal being associated with information independent of an operation of the throttle interface. Haptic feedback associated with the second input signal is output.

A related control-by-wire embodiment is "shift-by-wire," in which an automobile or other vehicle having a driving transmission is shifted through its transmission gears using electronic control rather than direct mechanical control. Thus, instead of the user moving a shift lever to predetermined mechanical positions to mechanically change gears, the user can manipulate an electronic control and the electronic system can change the actual transmission gears. A shift-by-wire system is disclosed in U.S. patent application Ser. No. 10/116,237 (Publication No. 2003/0188594 A1), which is incorporated herein by reference in its entirety.

Figure 1:
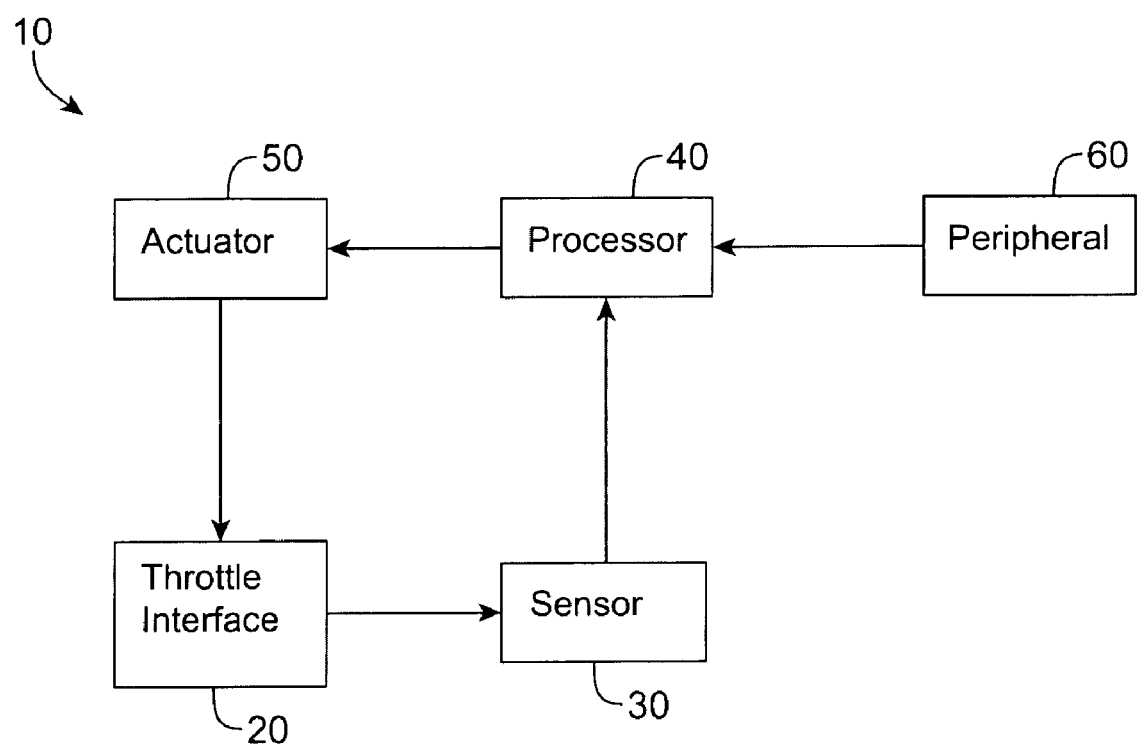
FIG. 1 is a schematic representation of a haptic throttle device according to an embodiment of the invention.

Referring to FIG. 1, a schematic illustration of a haptic throttle device is illustrated. The haptic throttle device 10 includes a throttle interface 20. A sensor 30 is configured to output a sensor signal associated with a condition of the throttle interface 20. For example, sensor 30 can be a position sensor configured to measure a relative or absolute position of the throttle interface, a strain gauge to measure a strain associated with input received from the throttle interface, and/or a force sensor configured to measure a magnitude of a force input from the throttle interface 20.

Sensor 30 can include, for example, optical encoders that provide signals to measure the movement of the throttle interface 20. Other types of sensors can also be used such as, for example, a potentiometer, a Hall effect sensor, a resolver, a load cell, a force sensitive resistor, a MEMS micro strain sensor, a resistive sensor, a piezoelectric sensor, a Linear Variable Displacement Transducer (LVDT), a Rotational Variable Displacement Transformer (RVDT), a capacitive sensor, or other analog or digital sensor. The sensor 30 can be an absolute or relative sensor.

The signal output from the sensor 30 is transmitted to a processor 40. In some embodiments of the invention, the processor includes a processor readable medium. The processor 40 is configured to receive signals from the sensor 30 and output signals to an actuator 50. In some embodiments of the invention, the processor 40 can receive and process signals associated with information independent of an operation of the throttle interface. For example, the processor 40 can receive signals from peripheral devices and/or systems 60 as will be discussed below.

The processor 40, according to some embodiments of the invention, can be a commercially available microprocessor or combination of microprocessors. Alternatively, the processor 40 can be an application-specific integrated circuit (ASIC) or a combination of ASICs, which are designed to achieve one or more specific functions, or enable one or more specific devices or applications. In yet another embodiment, the processor 40 can be an analog or digital circuit, or a combination of multiple circuits.

In some embodiments, the processor 40 includes or is coupled to the processor readable medium. The processor readable medium can include, for example, one or more types of memory. For example, the processor readable medium can include a read only memory (ROM) component and a random access memory (RAM) component. The processor readable medium can also include other types of memory that are suitable for storing data in a form retrievable by the processor 40. For example, electronically programmable read only memory (EPROM), erasable electronically programmable read only memory (EEPROM), flash memory, as well as other suitable forms of memory can be included within the processor readable medium. The processor 40 can also include a variety of other components, such as for example, co-processors, graphics processors, etc., depending upon the desired functionality of the interface device 10.

The processor 40 can store data in the processor readable medium or retrieve data previously stored in the processor readable medium. The components of the processor 40 can communicate with peripheral devices 60 external to the processor 40 by way of an input/output (I/O) component (not shown). According to some embodiments of the invention, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCSI) ports, and so forth. Additionally, the I/O component can include, for example, wireless connections, such as infrared ports, optical ports, Bluetooth® wireless ports, wireless LAN ports, or the like.

The actuator 50 is configured to output haptic feedback to the throttle interface 10 based on at least the sensor signal. The actuator 50 is configured to simulate friction that would be output by known gear and cable throttle systems. The actuator 50 can be for example, an electromagnetic actuator such as a solenoid, a voice coil, a DC motor, a linear actuator, a moving magnet actuator, a piezoelectric actuator, an electroactive polymer (EAP), a resistive actuator (e.g., a brake), a pneumatic actuator, etc. As will be discussed in greater detail, passive actuators, such as brakes, output a resistance to inhibit motion of the throttle interface, rather than outputting an active force on the throttle interface independently of the input as with active actuators. In some embodiments of the invention, the actuator 50 can include more than one actuator.

Figure 2:
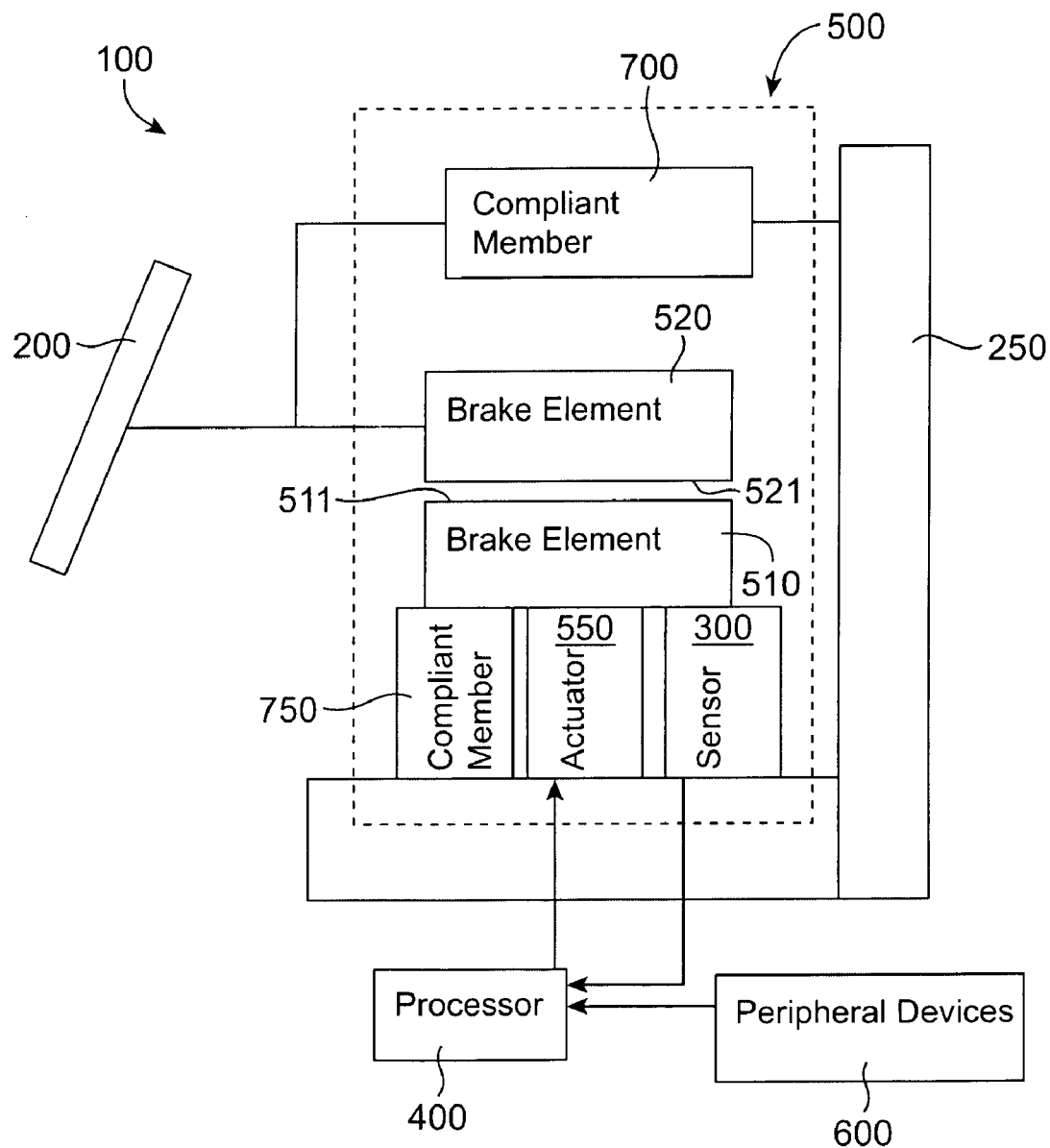
FIG. 2 is a schematic representation of a haptic throttle device according to another embodiment of the invention.

Referring to FIG. 2, in another embodiment of the invention, a device 100 includes a throttle interface 200, a sensor 300, an actuator assembly 500 and a processor or controller 400. The actuator assembly 500 includes a brake element 510 that has a friction surface 511, and a brake element 520 that has a friction surface 521. The friction surfaces 511, 521 can be, for example, metal (coated or uncoated), asbestos or other fibrous material, and/or a bushing material (e.g., sintered bronze and/or hard plastic). The friction surfaces 511, 521 need not include the same materials. A film or coating (not shown), a lubricant, or other fluid can be disposed between the friction surfaces 511, 521 (e.g., lubricating oil or grease, or dry film lubrication including mineral oil, natural or synthetic lubricants, molybdenum disulfide, PTFE, graphite, etc.) to enhance or control friction, mechanical wear or other desired properties.

The brake element 520 is coupled to the throttle interface 200. The friction surface 511 associated with the brake element 510 is positioned opposite the friction surface 521 associated with the brake element 520. The brake element 510 is configured to move relative to the brake element 520. For example, the brake element 510 and brake element 520 can be parallel plates that move with respect to each other in a linear or rotary direction. An actuator 550 is coupled to the brake element 510 and is configured to output haptic feedback to the throttle interface 200 via the brake elements 510, 520 based on a sensor signal received from the sensor 300. The components of actuator assembly 500 can be mounted to a housing 250 or some other mechanical ground (e.g., a vehicle body in which the device 100 is disposed). For example, brake elements 510, 520 can be coupled, either directly or indirectly, to the housing 250.

The actuator 550 is configured to output a force substantially normal to the brake element 510 and the brake element 520. The force output by the actuator 550 causes a friction force between the friction surface 511 and the friction surface 521. For example, the actuator 550 can be a voice coil-type actuator and can urge the brake element 510 towards the brake element 520 to cause the friction surfaces 511, 521 to move together, thereby resulting in a friction force as the brake element 520 moves with respect to brake element 510. Depending upon the magnitude of the force output by the actuator 550, the resulting friction force will be modified. As illustrated in FIG. 2, the brake element 520 is coupled to the throttle interface 200. When a force is input to the throttle interface 200 by a user, the brake element 520 moves with respect to the brake element 510. Depending upon the friction force that is applied, the haptic feedback felt by the user will vary. For example, as the throttle interface 200 is depressed by a user, the further the throttle interface 200 is depressed, the greater the magnitude of the haptic feedback output.

The processor 400 is configured to receive signals from the sensor 300 associated with inputs from the throttle interface 200. The processor 400 defines the control signal output to the actuator to modify the haptic feedback output to the throttle interface 200. In some embodiments of the invention, the processor 400 receives input signals from peripheral devices 600. For example, the peripheral devices 600 can include, for example, vehicle control systems such as the transmission, engine control systems, cruise control systems, driver preference systems such as climate control, weather sensing systems, vehicle fluid sensing systems, etc.

Figure 4:
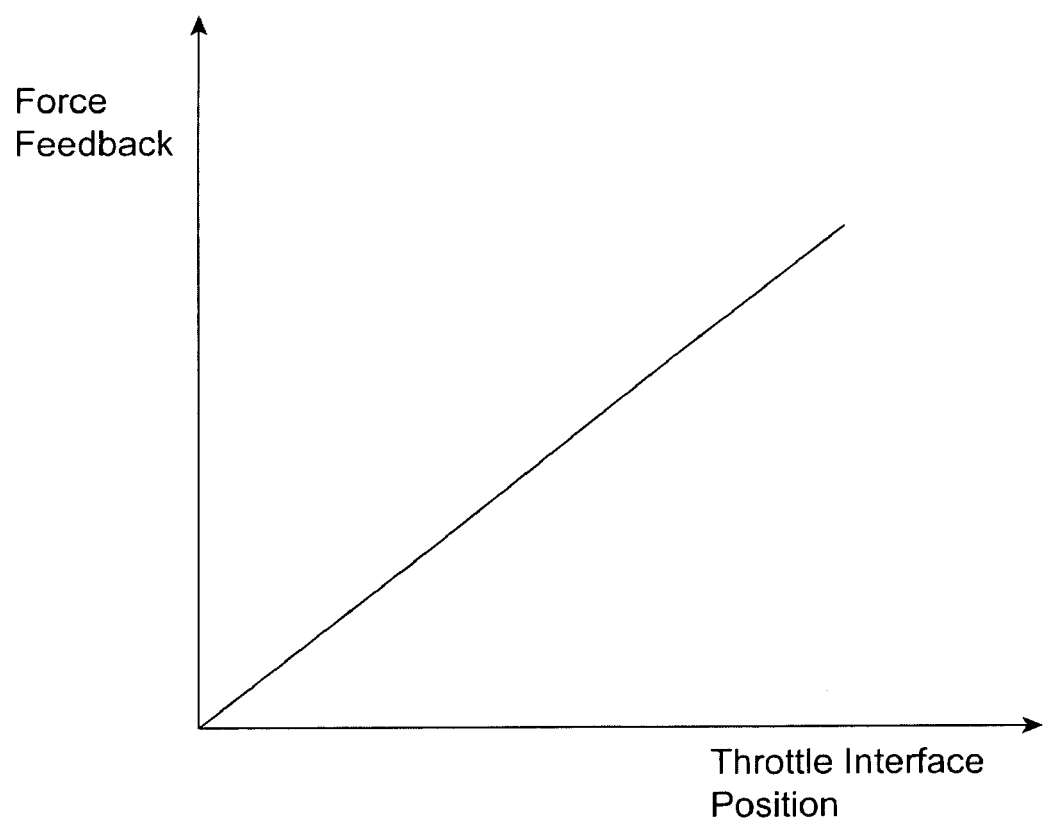
FIG. 4 is a graph illustrating an example of a relationship between force feedback provided to a throttle interface and the position of the throttle interface according to an embodiment of the invention.

A graph illustrating an example of a relationship between the magnitude of the force feedback provided to the throttle interface 200 and the position of the throttle interface is shown in FIG. 4. Although not illustrated in FIG. 4, it is understood that when the position of the throttle interface 200 is maintained constant over time, the magnitude of the force feedback provided to the throttle interface is substantially constant.

In some embodiments, the processor 400 can receive a signal associated with peripheral devices 600 and indicating, for example, that a predetermined threshold has been reached with respect to vehicle speed or engine RPM, or that the vehicle is approaching a barrier, etc. In such a situation, the actuator 550 can cause an increase in the friction force between the friction surfaces 511, 521 to prevent the throttle interface 200 from being pushed further.

Other peripheral devices 600 from which the processor 400 can receive signals include, for example, a wireless device such as a mobile phone, a Personal Digital Assistant (PDA), a radio, a CD player, and MP3 player, etc. In some embodiments of the invention, the processor 400 can receive signals from external sensors that detect allowable speed limits, global position, etc.

Figure 5:
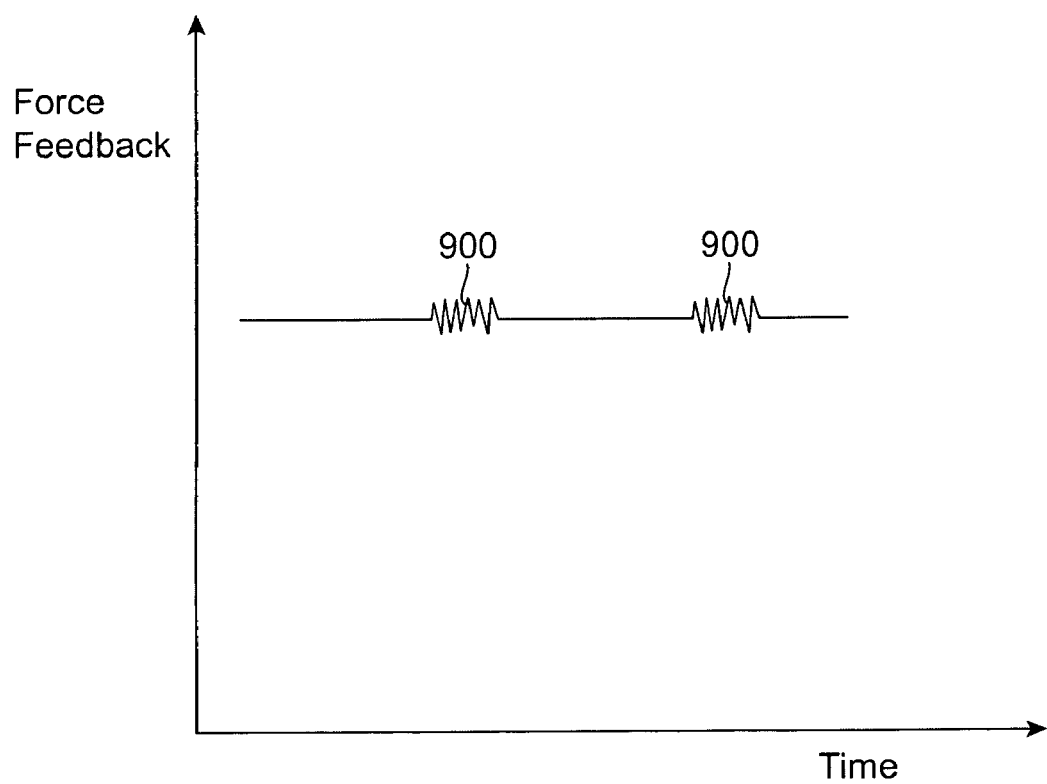
FIG. 5 is a graph illustrating an example of force feedback provided to the interface device of FIG. 2 over a period of time according to an embodiment of the invention.

FIG. 5 is a graph illustrating an example of the magnitude of the force feedback provided to the interface device 200 over a period of time. Haptic effects 900 are output at certain times based on sensor signals received from peripheral devices 600. The illustrated haptic effects 900 are provided by way of example only. As discussed below, any haptic effect can be output based on the sensor signal. As a result of the output of haptic effects 900, the user engaging the throttle will receive a particular feedback depending upon the peripheral device 600 with which the particular signal is associated.

In some embodiments of the invention, compliant element 700, such as a mechanical spring, is coupled between the throttle interface 200 and the housing 250. The compliant element 700 is configured to provide further resistance against movement of the throttle interface to simulate known mechanical throttle assemblies.

In some embodiments of the invention, the actuator assembly 500 includes a compliant element 750 that biases the brake elements 510, 520 together to generate a preset amount of force between the friction surfaces 511, 521. The compliant element 750 can be coupled in series and/or in parallel with the actuator 550. The compliant element 750 generates a substantially fixed amount of force, while the actuator 550 is configured to provide a variable amount of force as discussed above. This configuration allows the actuator assembly 550 to regulate the amount of force output to the throttle interface 200.

Figure 3:
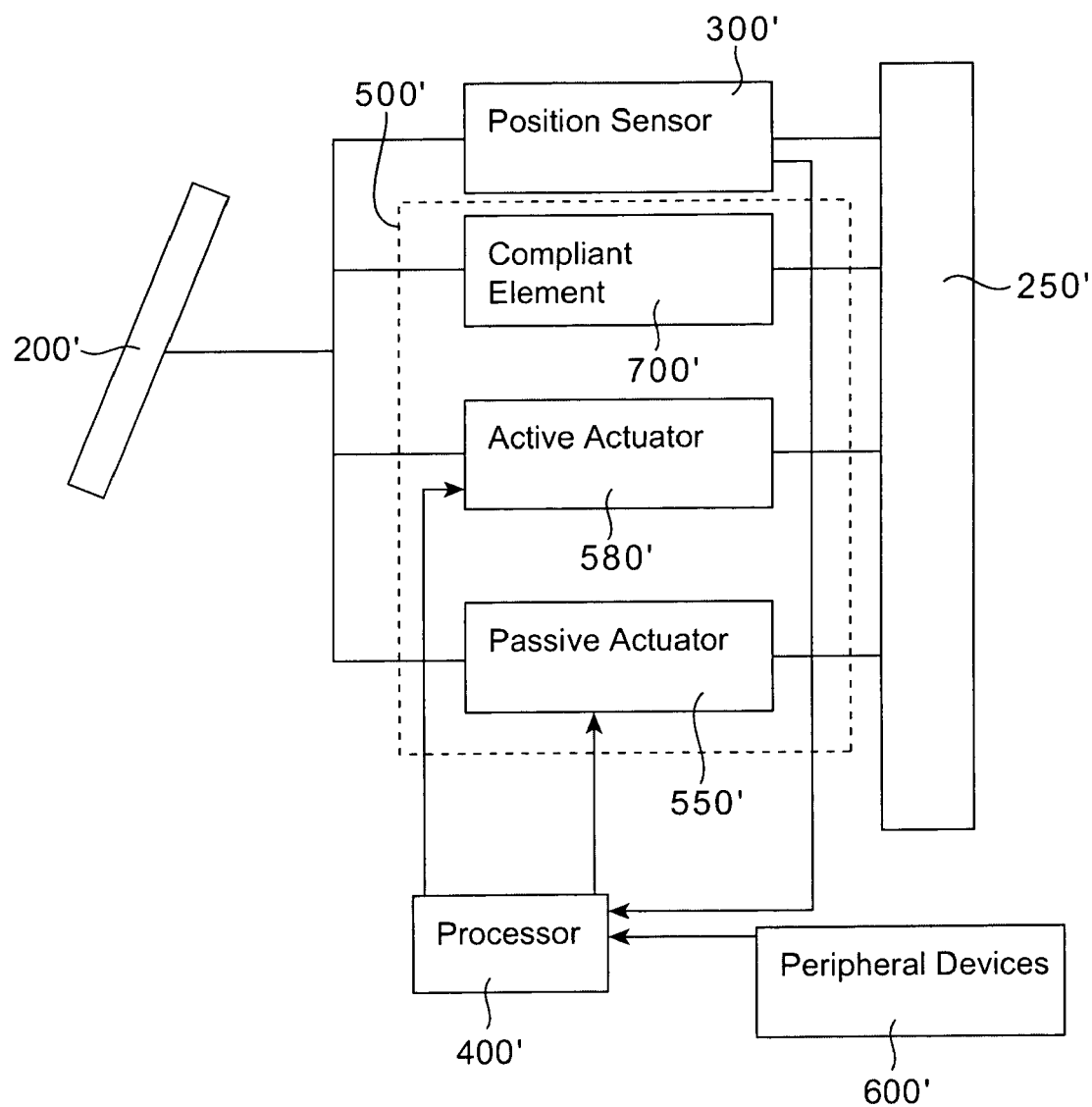
FIG. 3 is a schematic representation of a haptic throttle device according to a further embodiment of the invention.

In some embodiments of the invention, an actuator device 100' includes a throttle interface 200', a throttle condition sensor 300' and an actuator assembly 500' as illustrated in FIG. 3. The actuator assembly 500' includes a compliant element 700' coupled to the throttle interface 200' and a housing 250'; a resistive actuator 550' coupled to the throttle interface 200' and the housing 250'; and an active actuator 580 coupled to the throttle interface 200' and the housing 250'. A processor 400' is coupled to the resistive actuator 550' and the active actuator 580 and is configured to receive signals from the sensor 300' and output control signals to the active actuator 580 and the resistive actuator 550'.

The active actuator 580 actively provides a controllable amount of force to the throttle interface 200' in addition to the controllable amount of force resistively provided by the resistive actuator 550'. The active actuator 580 actively pushes the throttle interface 200' based on input signals received from processor 400', which in turn is based on signals received from sensor 300' and peripheral inputs 600'.

A number of force sensations can be output via the actuators such as actuators 50, 550, 550', 580. Force effects output on the throttle interface 200, 200' can include, for example, springs, dampers, textures, vibrations, detents, jolts or pulses, inertia, friction, obstructions (barriers), or dynamic force effects. Many of these effects are described in U.S. Pat. Nos. 5,734,373; 6,147,674; 6,154,201; and 6,128,006, all incorporated herein by reference in their entirety.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, although the above embodiments are described as including only one sensor, in alternative embodiments any number of sensors may be used to detect various conditions of the throttle interface and or various vehicle conditions.

Although the above embodiments are described as receiving signals from peripheral devices at a processor, in alternative embodiments the haptic throttle device can include local sensors that are configured to actively detect various conditions of peripheral devices.

Although the actuator 550 is described above as being configured to output a force substantially normal to the brake element 510 and the brake element 520, in alternative embodiments of the invention, the force need not be normal to the brake elements 510, 520.

What is claimed is:

1. An apparatus, comprising:
   a sensor configured to be coupled to a throttle interface, the sensor configured to output a sensor signal associated with a condition of the throttle interface;
   a first brake element having a first friction surface;
   a second brake element having a second friction surface and being configured to be coupled to the throttle interface, the friction surface associated with the first brake element being positioned opposite the friction surface associated with the second brake element, the first brake element configured to move relative to the second brake element; and
   an actuator coupled to the first brake element and configured to output haptic feedback to the throttle interface via the first brake element based on the sensor signal.

2. The apparatus of claim 1, wherein the actuator is configured to output a force substantially normal to the first element and the second element, the force being operative to cause a friction force between the first friction surface and the second friction surface.

3. The apparatus of claim 1, wherein the first element is configured to move with respect to the second element in one of a linear direction and a rotary direction.

4. The apparatus of claim 1, further comprising a connector element coupled between the throttle interface and the second brake element, the connector element being configured to amplify the haptic feedback.

5. The apparatus of claim 1, wherein the actuator is one of an electromagnetic actuator, hydraulic actuator, pneumatic actuator, piezoelectric actuator, thermal actuator and an electroactive polymer.

6. The apparatus of claim 1, wherein the sensor is one of a position sensor, strain gauge and force sensor.

7. The apparatus of claim 1, wherein the haptic feedback is associated with information independent of an operation of the throttle interface.

8. A method, comprising:
   receiving an input signal from a throttle interface;
   outputting a sensor signal associated with the input signal; and
   outputting via an actuator a force associated with the sensor signal, the actuator being coupled to a brake including a first friction surface, the force being substantially normal to a brake including a second friction surface positioned opposite the first friction surface, at least one brake being configured to be coupled to the throttle interface.

9. The method of claim 8, wherein the force is operative to cause a friction force between the first friction surface the second friction surface.

10. The method of claim 8, wherein the brake including the first friction surface is configured to move with respect to the brake including the second friction surface in one of a linear direction and a rotary direction.

11. The method of claim 8, further comprising amplifying the force associated with the sensor signal via a flexure mechanism coupled between the throttle interface and the brake element including the second friction surface.

12. The method of claim 8, further comprising outputting a feedback force to the throttle interface associated with information independent of an operation of the throttle interface.

13. The method of claim 8, further comprising outputting a feedback force associated with a mode selection signal to the throttle interface.

14. A method, comprising:
   receiving a sensor signal associated with a state of a throttle interface;
   receiving an input signal at a processor, the input signal being associated with information independent of an operation of the throttle interface; and
   outputting via an actuator haptic feedback associated with the input signal,
   wherein the outputting haptic feedback includes outputting at least one of a damping force, a vibration, a jolt, and a detent.

15. A processor-readable medium storing code representing instructions to cause a processor to perform a process, the code comprising code to:
   receive a sensor signal associated with a state of a throttle interface;
   receive an input signal at a processor, the input signal being associated with information independent of an operation of the throttle interface; and
   output via an actuator haptic feedback associated with the input signal, wherein the code to output haptic feedback is operative to cause a friction force between a first friction surface and a second friction surface.

16. A method, comprising:
   receiving a sensor signal associated with a state of a throttle interface;
   receiving an input signal at a processor, the input signal being associated with information independent of an operation of the throttle interface; and
   outputting via an actuator haptic feedback associated with the input signal,
   wherein the haptic feedback is operative to cause a friction force between a first friction surface and a second friction surface.

17. The method of claim 16, wherein the receiving the input signal includes receiving a signal associated with an automobile function.

18. The method of claim 16, wherein the receiving the input signal includes receiving a signal associated with a peripheral device.

19. The method of claim 16, wherein the sensor signal is configured to include an indication associated with an actuation of the throttle interface.

* * * * *